United States Patent
Abreu et al.

(10) Patent No.: US 9,586,687 B2
(45) Date of Patent: Mar. 7, 2017

(54) REMOVABLE SEAT DIVIDER FOR PLACEMENT IN A SEAT

(71) Applicant: THE BOEING COMPANY, Chicago, IL (US)

(72) Inventors: Julio E. Abreu, Mount Pleasant, SC (US); Christopher John Mills, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/722,951

(22) Filed: May 27, 2015

(65) Prior Publication Data
US 2016/0347454 A1 Dec. 1, 2016

(51) Int. Cl.
*A47B 23/00* (2006.01)
*B64D 11/06* (2006.01)
*B60N 3/00* (2006.01)

(52) U.S. Cl.
CPC .......... *B64D 11/0606* (2014.12); *B60N 3/002* (2013.01); *B64D 11/0638* (2014.12)

(58) Field of Classification Search
CPC .... A47B 31/06; B60N 3/002; B64D 11/0606; B64D 11/0638
(Continued)

(56) References Cited

U.S. PATENT DOCUMENTS 2,926,794 A * 3/1960 Karoff ..................... A47B 13/16
108/173

3,436,092 A * 4/1969 Werner ................... A47B 31/04
108/115
(Continued)

FOREIGN PATENT DOCUMENTS

| EP | 2028580 A1 | 2/2009 |
|---|---|---|
| EP | 2873904 A1 | 5/2015 |
| WO | 9849414 A1 | 11/1998 |

OTHER PUBLICATIONS

European Patent Office Communication re European Search Report, Application No. 14193275.6.
(Continued)

*Primary Examiner* — Jose V Chen
(74) *Attorney, Agent, or Firm* — The Boeing Company; Francisco A. Rubio-Campos

(57) ABSTRACT

Disclosed is a removable seat divider for placement in a seat. The removable seat divider includes a vertical structure configured to be placed on the seat along an approximate center of the seat. The vertical structure includes a first outer surface, second outer surface, top, and back portion, where the back portion of the vertical structure is configured to be placed adjacent to a back portion of the seat. The removable seat divider also includes a cavity located adjacent to the back portion, where the cavity connects the first outer surface to the second outer surface, and the cavity is configured to pass a seat belt through the cavity. The base back portion is configured to produce a restraining force against the seat that is proportional to a tension on the seat belt that passes through the cavity. The removable seat divider further includes two opposing planar members that are rotationally coupled to the top of the vertical structure, where the two opposing planar members are configured to fold outward from the vertical structure to form a T-type structure, when fully folded out, having two work surfaces.

20 Claims, 16 Drawing Sheets

(58) Field of Classification Search
USPC ......... 108/44, 45; 296/24.46, 24.4; 297/135, 297/145, 160
See application file for complete search history.

(56) References Cited

U.S. PATENT DOCUMENTS

| | | | | |
|---|---|---|---|---|
| 4,118,812 A * | 10/1978 | Pangburn | ................. | B60N 2/28 5/513 |
| 4,795,210 A * | 1/1989 | Milat | .................... | B60N 3/002 108/43 |
| 4,938,401 A * | 7/1990 | Weisbrodt | ............... | B60R 7/043 108/44 |
| 5,007,569 A * | 4/1991 | Zarb | ....................... | B60R 7/043 220/505 |
| 5,123,707 A * | 6/1992 | Wurzell | .................. | B60N 2/44 297/463.2 |
| D339,681 S * | 9/1993 | Okoli | .......................... | D12/419 |
| 5,255,958 A * | 10/1993 | Frischmann | ............. | B60N 2/28 297/232 |
| 5,322,021 A * | 6/1994 | Jackson | ................. | B60N 3/002 108/44 |
| 5,390,609 A * | 2/1995 | McKee | .................. | B60N 3/002 108/45 |
| D366,164 S * | 1/1996 | McKee | ........................ | D12/419 |
| 5,562,331 A * | 10/1996 | Spykerman | .......... | B60N 2/4686 297/188.16 |
| 5,751,548 A | 5/1998 | Hall et al. | | |
| 5,971,487 A * | 10/1999 | Passehl | ................... | B60N 2/28 108/44 |
| 6,015,198 A * | 1/2000 | Stair | ..................... | B60N 3/002 108/44 |
| 6,135,546 A * | 10/2000 | Demtchouk | ........... | B60N 3/002 108/44 |
| D438,029 S * | 2/2001 | Brey | .......................... | D6/406.3 |
| 6,260,903 B1 * | 7/2001 | von der Heyde | .... | B60N 2/2821 296/24.46 |
| 7,669,907 B2 * | 3/2010 | Spater | ..................... | B60R 21/06 296/24.46 |
| 8,109,526 B2 * | 2/2012 | Mason | ..................... | B62B 3/02 280/47.35 |
| 8,430,041 B2 * | 4/2013 | Moronval | ............... | A47B 3/00 108/115 |
| 8,714,655 B2 * | 5/2014 | Cahall | .................... | B60N 2/441 297/464 |
| 9,079,545 B2 * | 7/2015 | Dugan | ................... | B60R 11/02 |
| 9,216,674 B1 * | 12/2015 | Garib | ..................... | B60N 2/441 |
| 2001/0042812 A1 | 11/2001 | Perzewski | | |
| 2002/0180229 A1* | 12/2002 | Wheat | ...................... | B60P 3/03 296/24.46 |
| 2005/0040299 A1 | 2/2005 | Twyford | | |
| 2009/0161302 A1 | 6/2009 | Ferren et al. | | |
| 2012/0193488 A1 | 8/2012 | Chung et al. | | |

OTHER PUBLICATIONS

European Patent Office Communication re Notification of European publication No. EP2873904A1, Apr. 22, 2015.

* cited by examiner

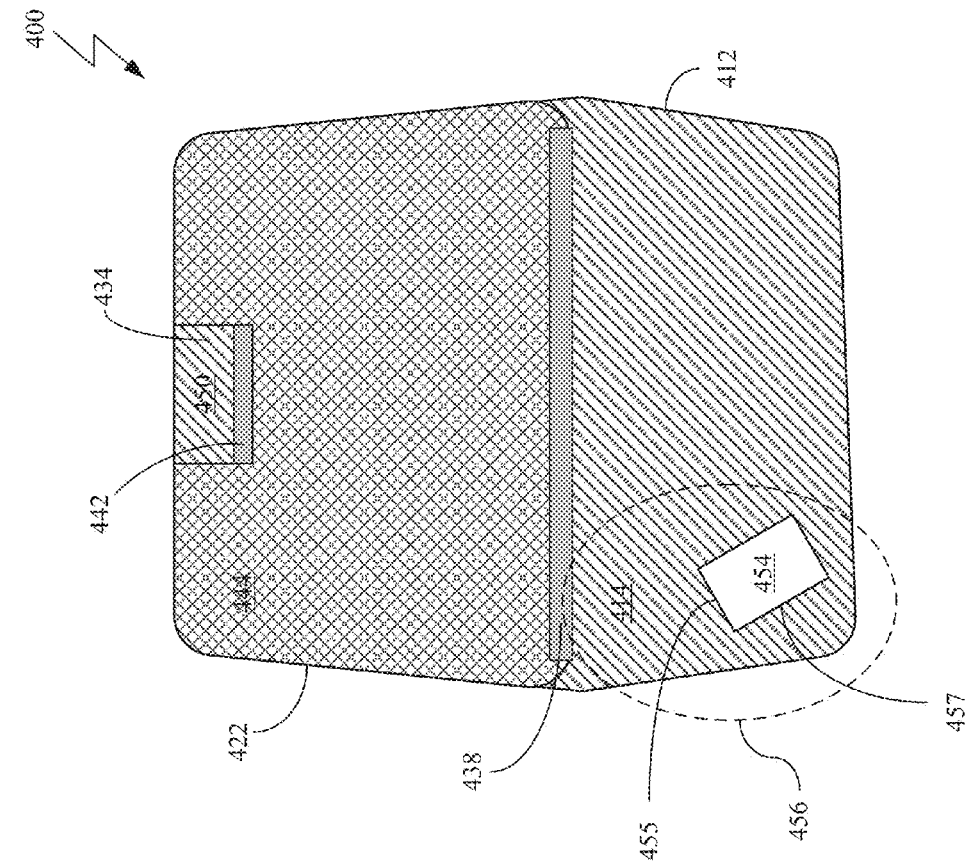
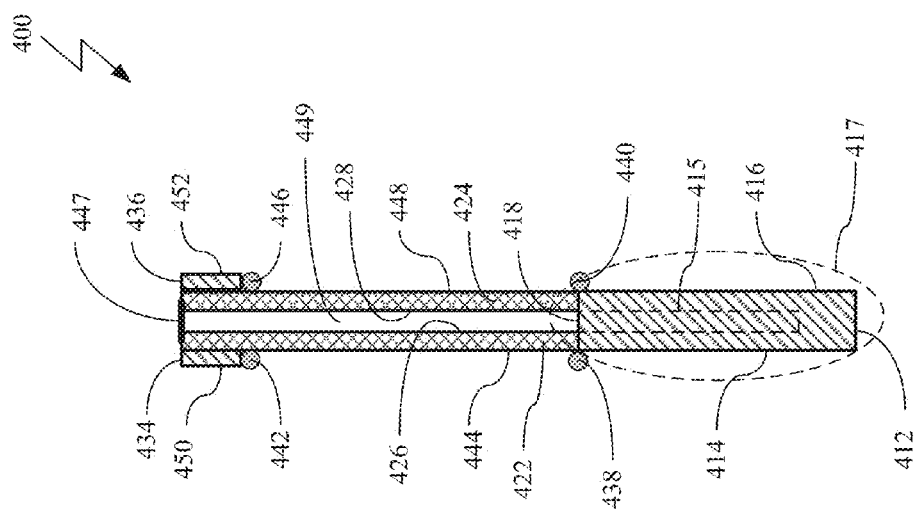
FIG. 5A
FIG. 5B

REMOVABLE SEAT DIVIDER FOR PLACEMENT IN A SEAT

BACKGROUND OF THE INVENTION

1. Field of the Invention

The present disclosure is generally related to passenger transportation vehicles and more particularly to systems for enhancing the passenger experience in a seat within the passenger transportation vehicle.

2. Related Art

At present, commercial air travel has become a common form of travel and competition among airlines has become very competitive. As the operating costs and appearance of low-cost airlines have increased, airlines have turned to numerous approaches for increasing revenue with the existing base number of air travelers. These approaches have included charging for or eliminating food services on flights, charging for check-in baggage and/or carry-on baggage, and creating new sub-classes of economy class seating.

An example approach has included creating an "economy plus" type of sub-class within the economy class seating that allows passengers to pay a higher airfare for certain economy class seats in the economy section (i.e., cabin) of the aircraft so as to enhance the passenger's experience on the flight. This has included increasing distance between seat rows (i.e., the seat pitch) to provide greater leg room, aisle seats, and certain window seats as "enhanced" seats within the economy cabin that have a higher airfare cost than the other seats within the economy cabin.

In furtherance of this trend, recently, some airlines have started "blocking out" center seats of triple seats as part of their economy plus offerings to provide additional comfort to passengers, as shown in FIG. 1, where blocked out seats are seats that are not offered for sale, thereby resulting in a seat remaining vacant for a given flight. In FIG. 1, a top-view of an example of an implementation of a known economy class cabin 100 (also known as the "main cabin") in an aircraft is shown. In this example, three seats 102, 104, and 106 are shown as being blocked-out between window and aisle seats 108, 110, 112, and 114 and aisle seats 116 and 118, respectively.

The reason for this has been that the center seats in triple seat configurations are usually the last seats booked because they are generally the less attractive seats. As such, when a center seat is not booked the passengers sitting in the aisle and window seats adjacent to the center seat have extra space around them due to the empty center seat, even if both the aisle and windows seats are standard economy class seats.

There is a need for providing passengers in aisle and window seats that are adjacent to the blocked out center seats with an enhanced travel experience.

SUMMARY

Disclosed is a removable seat divider for placement in an empty passenger seat. The removable seat divider includes a vertical structure configured to be placed on the seat along an approximate center of the seat. The vertical structure includes a first outer surface, second outer surface, top, and back portion, where the back portion of the vertical structure is configured to be placed adjacent to a back portion of the seat. The removable seat divider also includes a cavity located adjacent to the back portion, where the cavity connects the first outer surface to the second outer surface, and the cavity is configured to pass a seat belt through the cavity to secure the removable seat divider to the seat. The base back portion is configured to produce a restraining force against the seat that is proportional to a tension on the seat belt that passes through the cavity. The removable seat divider further includes two opposing planar members that are rotationally coupled to the top of the vertical structure, where the two opposing planar members are configured to fold outward from the vertical structure to form a T-type structure, when fully folded out, having two work surfaces.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 5A is a front-view of an example of an implementation of the removable seat divider shown in FIG. 4 in a collapsed state in accordance with the present invention.

FIG. 5B is a side-view of an example of an implementation of the removable seat divider shown in FIGS. 4 and 5A in a collapsed state in accordance with the present invention.

DETAILED DESCRIPTION

Disclosed is a removable seat divider for placement in a seat. The removable seat divider includes a vertical structure configured to be placed on the seat along an approximate center of the seat. The vertical structure includes a first outer surface, second outer surface, top, and back portion, where the back portion of the vertical structure is configured to be placed adjacent to a back portion of the seat. The removable seat divider also includes a cavity located adjacent to the back portion, where the cavity connects the first outer surface to the second outer surface, and the cavity is configured to pass a seat belt through the cavity to secure the removable seat divider to the seat. The base back portion is configured to produce a restraining force against the seat that is proportional to a tension on the seat belt that passes through the cavity. The removable seat divider further includes two opposing planar members that are rotationally coupled to the top of the vertical structure, where the two opposing planar members are configured to fold outward from the vertical structure to form a T-type structure, when fully folded out, having two work surfaces.

Figure 1:
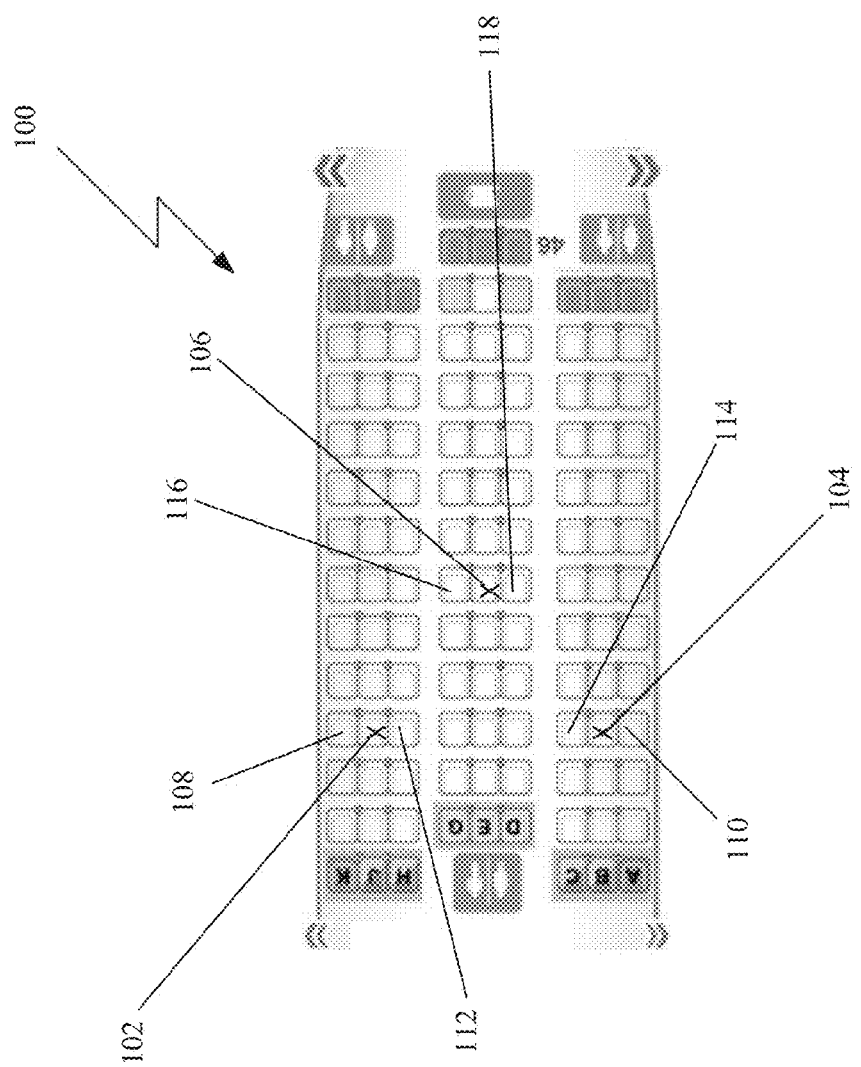
FIG. 1 is top-view of an example of an implementation of a known economy class cabin in an aircraft.
Figure 2:
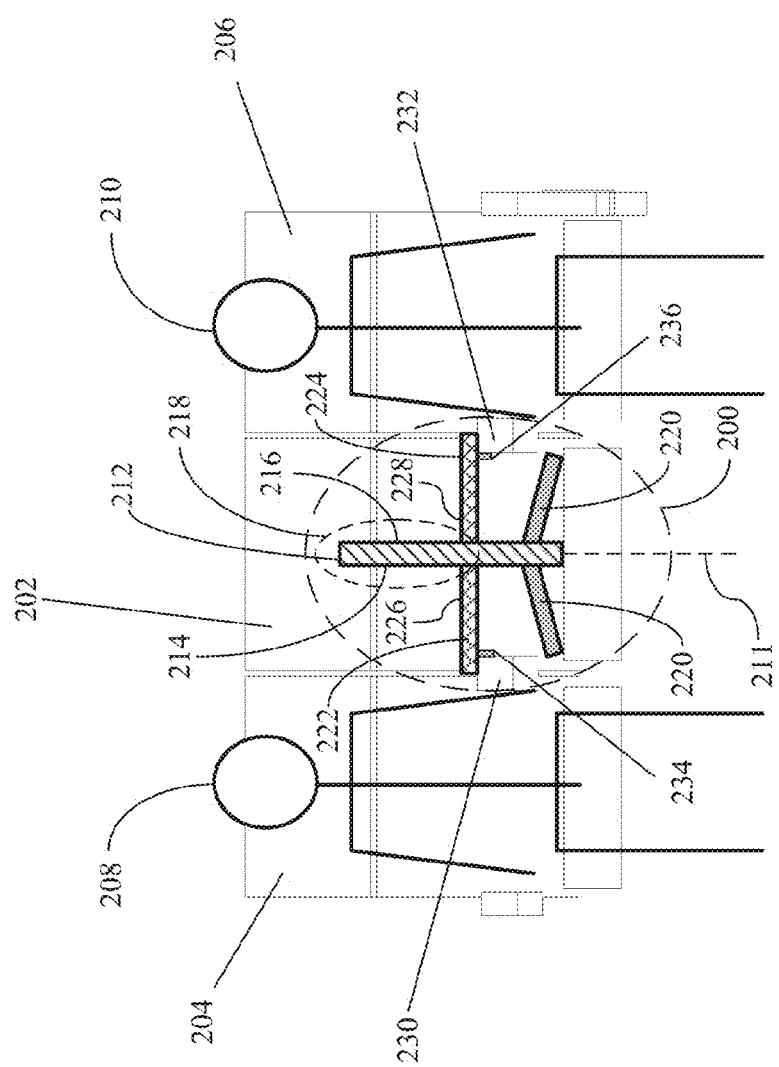
FIG. 2 is front-view of an example of an implementation of a removable seat divider in a seat in accordance with the present invention.

Turning to FIG. 2, a front-view of an example of an implementation of a removable seat divider 200 in a seat 202 is shown in accordance with the present invention. The seat 202 may be a center seat that is located between two adjacent other seats 204 and 206, which may be either aisle or window seats. In this example, the center seat 202 and two adjacent seats 204 and 206 may be seats in a commercial aircraft or other passenger vehicle such as, for example, a train, bus, or ship. The removable seat divider 200 may be utilized by two persons 208 and 210 seated in the adjacent seats 204 and 206, respectively. In general, the removable seat divider 200 may be placed along an approximate center line 211 of the seat 202.

The removable seat divider 200 may include a vertical structure 212 that includes a first outer surface 214, second outer surface 216, top 218 (also referred to as a top portion), and back portion (not shown). The removable seat divider 200 also includes a cavity (not shown) located adjacent to the back portion, where the cavity connects the first outer surface 214 to the second outer surface 216, and the cavity is configured to pass a seat belt 220 through the cavity.

The removable seat divider 200 further includes two opposing planar members 222 and 224 that are rotationally coupled to the top portion 218 of the vertical structure 212, where the two opposing planar members 222 and 224 are configured to fold outward from the vertical structure 212 to form a T-type structure, when fully folded out, having two work surfaces 226 and 228, respectively. The two opposing planar members 222 and 224 may extend to and rest on the corresponding adjacent armrests 230 and 232, respectively. The removable seat divider 200 may also include two armrest support flaps 234 and 236 that are configured to engage the first armrest 230 and second armrest 232, respectively. The two armrest support flaps 234 and 236 may add to enhanced lateral stability. In this example, the two opposing planar members 222 and 224 may have an approximate equal length of about 8.5 inches and the vertical structure 212 may be approximately 16 inches in length. The vertical structure 212 may also be approximately one inch thick. Additionally, in this example, the top 218 of the vertical structure 212 may be configured to operate as a privacy block member (i.e., a sight block member) that helps prevent each of the persons 208 and 210 from seeing what the other person 208 or 210 is doing on the corresponding work surface 226 or 228.

Figure 3B:
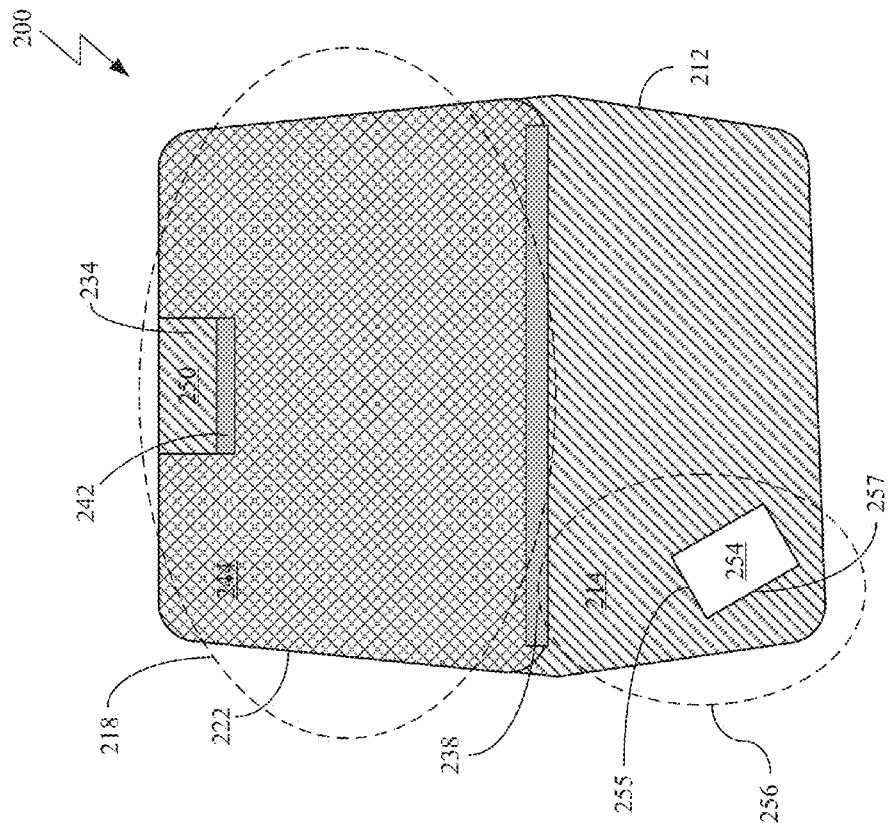
FIG. 3B is a side-view of an example of an implementation of the removable seat divider shown in FIGS. 2 and 3A in a collapsed state in accordance with the present invention.
Figure 3A:
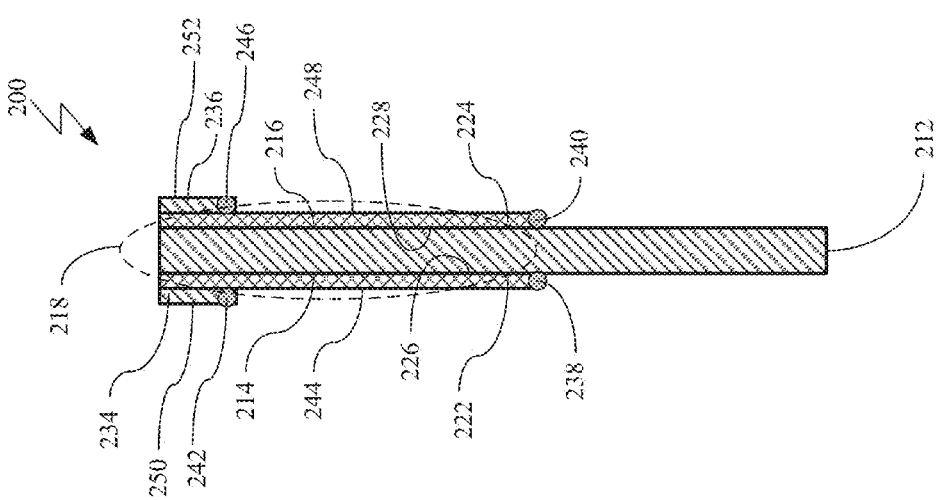
FIG. 3A is a front-view of an example of an implementation of the removable seat divider shown in FIG. 2 in a collapsed state in accordance with the present invention.

In FIG. 3A, a front-view of an example of an implementation of the removable seat divider 200 (shown in FIG. 2) is shown in a collapsed state in accordance with the present invention. In this example, the removable seat divider 200 may include a first hinge 238 rotationally coupling the first planar member 222 to the first outer surface 214 of the vertical structure 212. Similarly, the removable seat divider 200 may also include a second hinge 240 rotationally coupling the second planar member 224 to the second outer surface 216 of the vertical structure 212. Furthermore, the removable seat divider 200 may include a third hinge 242 rotationally coupling the first armrest support flap 234 to the bottom 244 of the first planar member 222. Similarly, the removable seat divider 200 may also include a fourth hinge 246 rotationally coupling the second armrest support flap 236 to the bottom 248 of the second planar member 224.

It is appreciated by those of ordinary skill in the art that while the first and second planar members 222 and 224 are shown in FIG. 3A as resting adjacent to the first and second outer surfaces 214 and 216 of the vertical structure 212, this is for simplicity and does not limit other possible arrangements. As an example, the first and second planar members 222 and 224 may rest within pocket cavities (not shown) along the first and second outer surfaces 214 and 216 that allow the bottom 244 and 238 of the first and second planar members 222 and 224 to be flush with the first and second outer surfaces 214 and 216, respectively. Furthermore, in this example, the first and second hinges 238 and 240 may also rest within pocket cavities. Moreover, the first and second hinges 238 and 240 may be integrated within the first and second planar members 222 and 224.

It is also appreciated that the first and second armrest support flaps 234 and 236 may also rest within pocket cavities (not shown) along the bottom 244 and 238 of the first and second planar members 222 and 224, respectively, that allow the bottom 250 and 252 of the armrest support flaps 234 and 236 to be flush with the bottom 244 and 238 of the first and second planar members 222 and 224, respectively. Similarly, in this example, the third and fourth hinges 242 and 246 may also rest within pocket cavities of the first and second planar members 222 and 224. Additionally, the third and fourth hinges 242 and 246 may be integrated within the first and second planar members 222 and 224.

In FIG. 3B, a side-view of an example of the implementation of the removable seat divider 200 (shown in FIGS. 2 and 3A) is shown in a collapsed state in accordance with the present invention. In this view, the removable seat divider 200 is shown having the first planar member 222, first hinge 238, first armrest support flap 234, and third hinge 242. Additionally, in this example, the vertical structure 212 is shown having a pass through cavity 254 (i.e., a hole) in the back portion 256 of the vertical structure 212. The cavity 254 passes through the back portion 256 of the vertical structure 212 connecting the first and second outer surfaces 214 and 216. The size, shape, and thickness of the cavity 254 is configured to pass a seat belt (not shown) through the cavity 254 and in combination with the configuration (i.e., the size, shape, and thickness) of the back portion 256 of the vertical structure 212 produce a restraining force against the back of a seat that is proportional to a tension placed on a seat belt that passes through the cavity. As an example, the cavity 254 may have dimensions of approximately 2.0 inches by 2.5 inches along the cavity edges 255 and 257, respectively, with a depth of approximately one inch.

Figure 3C:
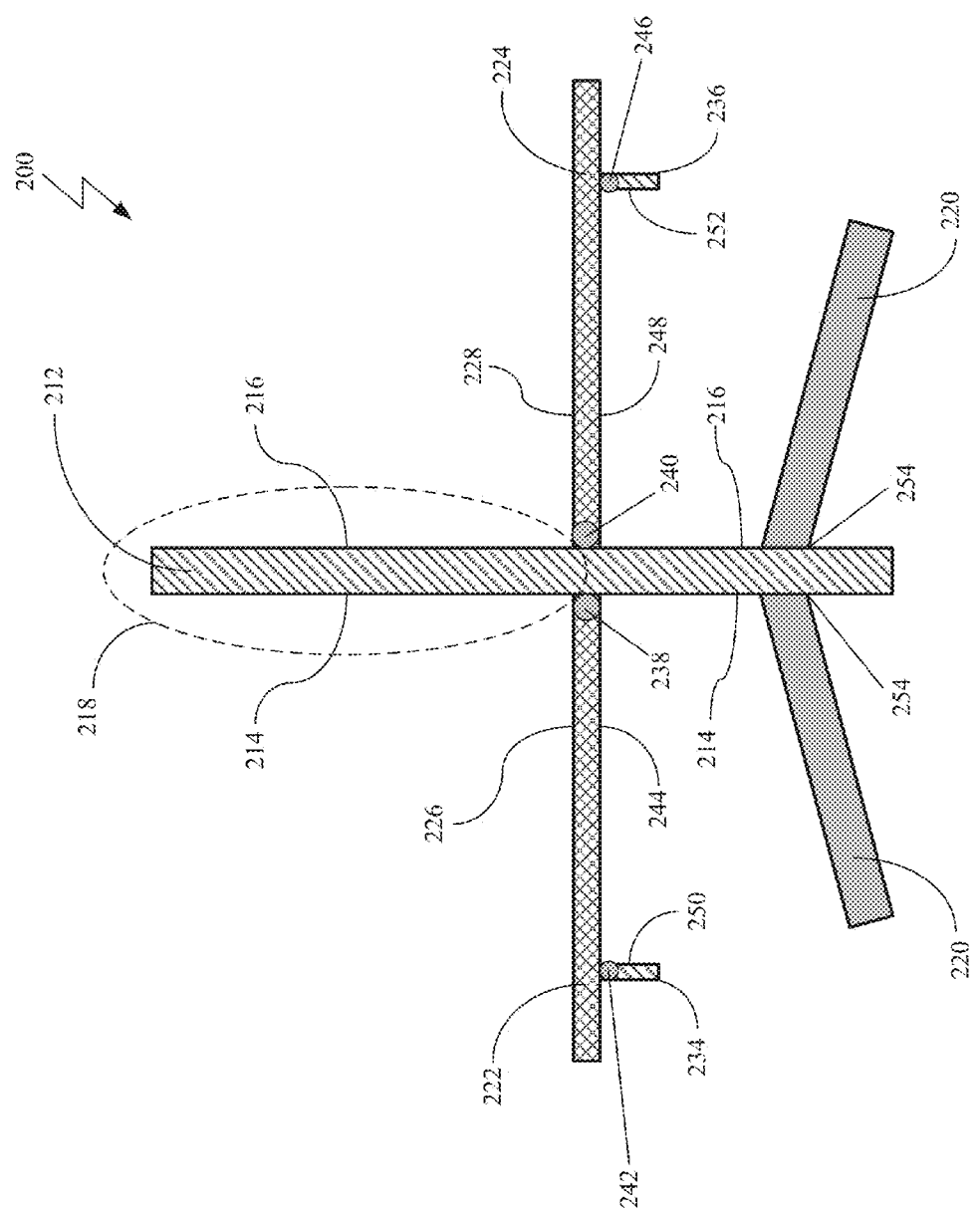
FIG. 3C is a front-view of an example of an implementation of the removable seat divider shown in FIGS. 2, 3A, and 3B in an extended state in accordance with the present invention.

In FIG. 3C, a front zoomed-in-view of the example of the implementation of the removable seat divider 200 (shown in FIGS. 2, 3A, and 3B) is shown in an extended state in accordance with the present invention. In this view, the seat belt 220 is shown passing through the cavity 254. When the removable seat divider 200 is in the collapsed position (as shown in FIGS. 3A and 3B), it may be stowed efficiently under the seat or in an overhead storage bin.

Figure 4:
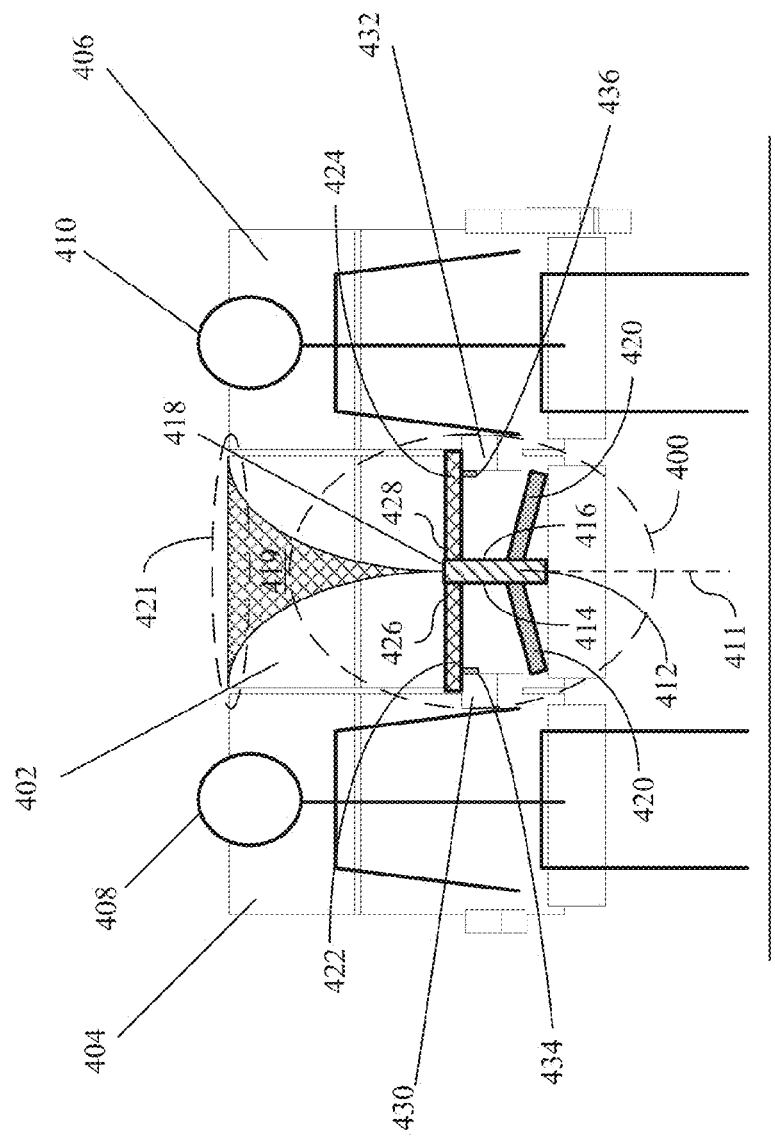
FIG. 4 is front-view of an example of another implementation of a removable seat divider in a seat in accordance with the present invention.

Turning to FIG. 4, a front-view of an example of another implementation of a removable seat divider 400 in a seat 402 is shown in accordance with the present invention. As described earlier, the seat 402 may be a center seat that is located between two adjacent other seats 404 and 406, which may be either an aisle or window seats. In this example, the center seat 402 and two adjacent seats 404 and 406 may be seats in a commercial aircraft or other passenger vehicle such as, for example, a train, bus, or ship. The removable seat divider 400 may be utilized by two persons 408 and 410 seated in the adjacent seats 404 and 406, respectively. In general, the removable seat divider 400 may be placed along an approximate center line 411 of the seat 402.

The removable seat divider 400 may include a vertical structure 412 that includes a first outer surface 414, second outer surface 416, top 418 (also referred to as a top portion), and back portion (not shown). The removable seat divider 400 also includes a cavity (not shown) located adjacent to the back portion, where the cavity connects the first outer surface 414 to the second outer surface 416, and the cavity is configured to pass a seat belt 420 through the cavity.

The removable seat divider 400 further includes two opposing planar members 422 and 424 that are rotationally coupled to the top portion 418 of the vertical structure 412, where the two opposing planar members 422 and 424 are configured to fold outward from the vertical structure 412 to form a T-type structure, when fully folded out, having two work surfaces 426 and 428, respectively. The two opposing planar members 422 and 424 may extend to and rest on the corresponding adjacent armrests 430 and 432, respectively. The removable seat divider 400 may also include two armrest support flaps 434 and 436 that are configured to engage the first armrest 430 and second armrest 432, respectively. In this example, the two opposing planar members 422 and 424 may have an approximate equal length of about 8.5 inches and the vertical structure 412 may be approximately 16 inches in length. Additionally, in this example, the top 418 of the vertical structure 412 may be include an expandable privacy block member 419 that helps prevent each of the persons 408 and 410 from seeing what the other person 408 or 410 is doing on the corresponding work surface 426 or 428. The privacy block member 419 may be a fabric type member that is stowed within a hollow cavity (not shown) within the vertical structure 412 when the removable seat divider 400 is in the collapsed position. When in the expanded position, the privacy block member 419 may be extended from the vertical structure 412 to the top 421 of the seat 402, where the privacy block member 419 may include a "hood" type portion that slips on top 421 of the seat 402.

In FIG. 5A, a front-view of an example of an implementation of the removable seat divider 400 (shown in FIG. 4) is shown in a collapsed state in accordance with the present invention. In this example, the removable seat divider 400 may include a first hinge 438 rotationally coupling the first planar member 422 to the first outer surface 414 of the vertical structure 412. Similarly, the removable seat divider 400 may also include a second hinge 440 rotationally coupling the second planar member 424 to the second outer surface 416 of the vertical structure 412. Furthermore, the removable seat divider 400 may include a third hinge 442 rotationally coupling the first armrest support flap 434 to the bottom 444 of the first planar member 422. Similarly, the removable seat divider 400 may also include a fourth hinge 446 rotationally coupling the second armrest support flap 436 to the bottom 448 of the second planar member 424. In this example, the two opposing planar members 422 and 424 may be held together in the collapsed position by a retaining strap 447. Additionally, when in the collapsed position, the two opposing planar members 422 and 424 may have an open space 449 between them and the privacy block member 419 may be collapsed in an inner cavity 415 within the lower portion 417 of the vertical structure 412. The privacy block member 419 may extend from the inner cavity 415 in the vertical structure 412, through the top 418 and through the open space 449.

It is appreciated by those of ordinary skill in the art that while the first and second planar members 422 and 424 are shown in FIG. 5A as resting adjacent to each other defining open space 449, this is for simplicity and does not limit other possible arrangements. As an example, the first and second planar members 222 and 224 may rest adjacent to each other where they are physically touching each other. In this example, the first and second planar members 222 and 224 may be configured to separate a bit when expanded to allow space for the privacy block member 419 to be deployed from the top 418 of the vertical structure 412. Furthermore, in this example, the first and second hinges 438 and 440 may be integrated within the first and second planar members 422 and 424 so as to be flush with the first outer surface 414, second outer surface 416, bottom 444 of the first planar member 422, and bottom 448 of the second planar member 424, respectively.

It is also appreciated that the first and second armrest support flaps 434 and 436 may rest within pocket cavities (not shown) along the bottom 444 and 438 of the first and second planar members 422 and 424, respectively, that allow the bottom 450 and 452 of the armrest support flaps 434 and 436 to be flush with the bottom 444 and 438 of the first and second planar members 422 and 424, respectively. Similarly, in this example, the third and fourth hinges 442 and 446 may also rest within pocket cavities of the first and second planar members 422 and 424. Additionally, the third and fourth hinges 442 and 446 may be integrated within the first and second planar members 422 and 424.

In FIG. 5B, a side-view of an example of the implementation of the removable seat divider 400 (shown in FIGS. 4 and 5A) is shown in a collapsed state in accordance with the present invention. In this view, the removable seat divider 400 is shown having the first planar member 422, first hinge 438, first armrest support flap 434, and third hinge 442. Additionally, in this example, the vertical structure 412 is shown having a pass through cavity 454 (i.e., a hole) in the back portion 456 of the vertical structure 412. The cavity 454 passes through the back portion 456 of the vertical structure 412 connecting the first and second outer surfaces 414 and 416. Again, the size, shape, and thickness of the cavity 454 is configured to pass a seat belt (not shown) through the cavity 454 and in combination with the configuration (i.e., the size, shape, and thickness) of the back portion 456 of the vertical structure 412 produce a restraining force against the back of a seat that is proportional to a tension placed on a seat belt that passes through the cavity. As an example, the cavity 454 may have dimensions of approximately 2.0 inches by 2.5 inches along the cavity edges 455 and 457, respectively, with a depth of approximately one inch.

Figure 5C:
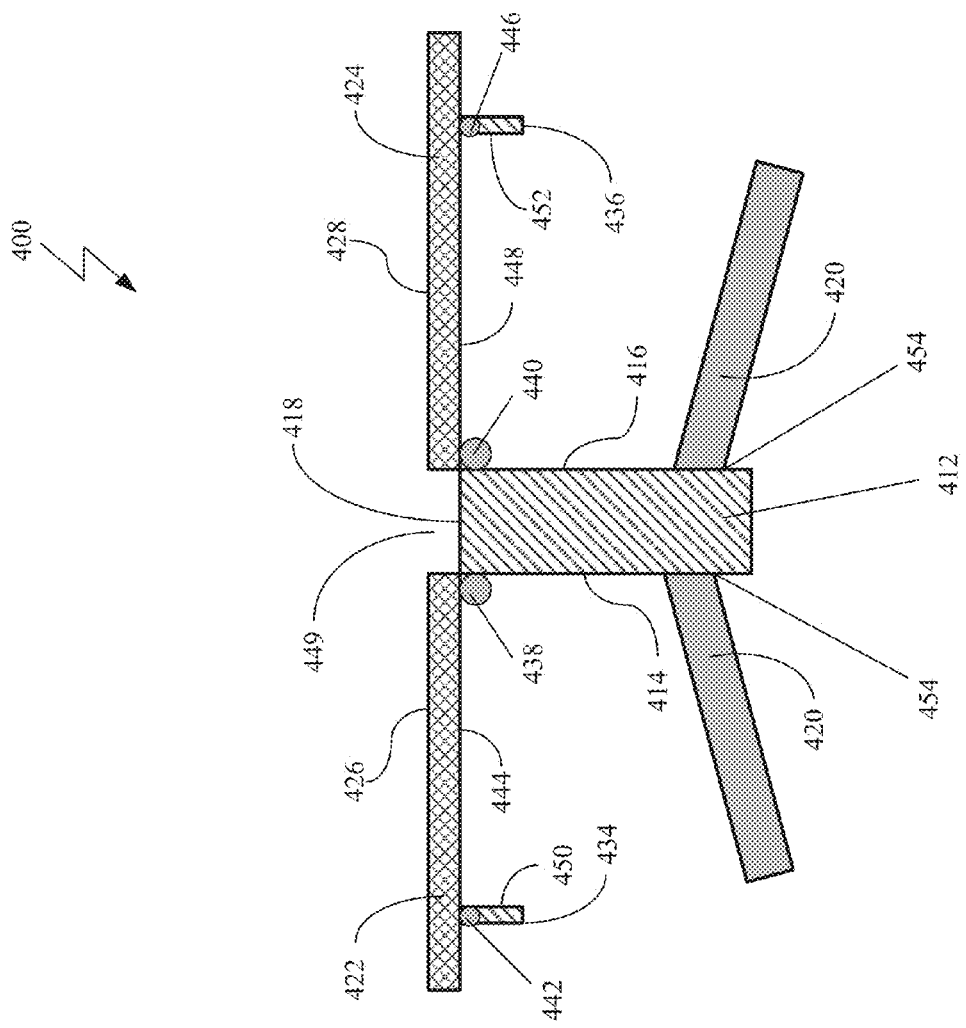
FIG. 5C is a front-view of an example of an implementation of the removable seat divider shown in FIGS. 4, 5A, and 5B in an extended state in accordance with the present invention.
Figure 5D:
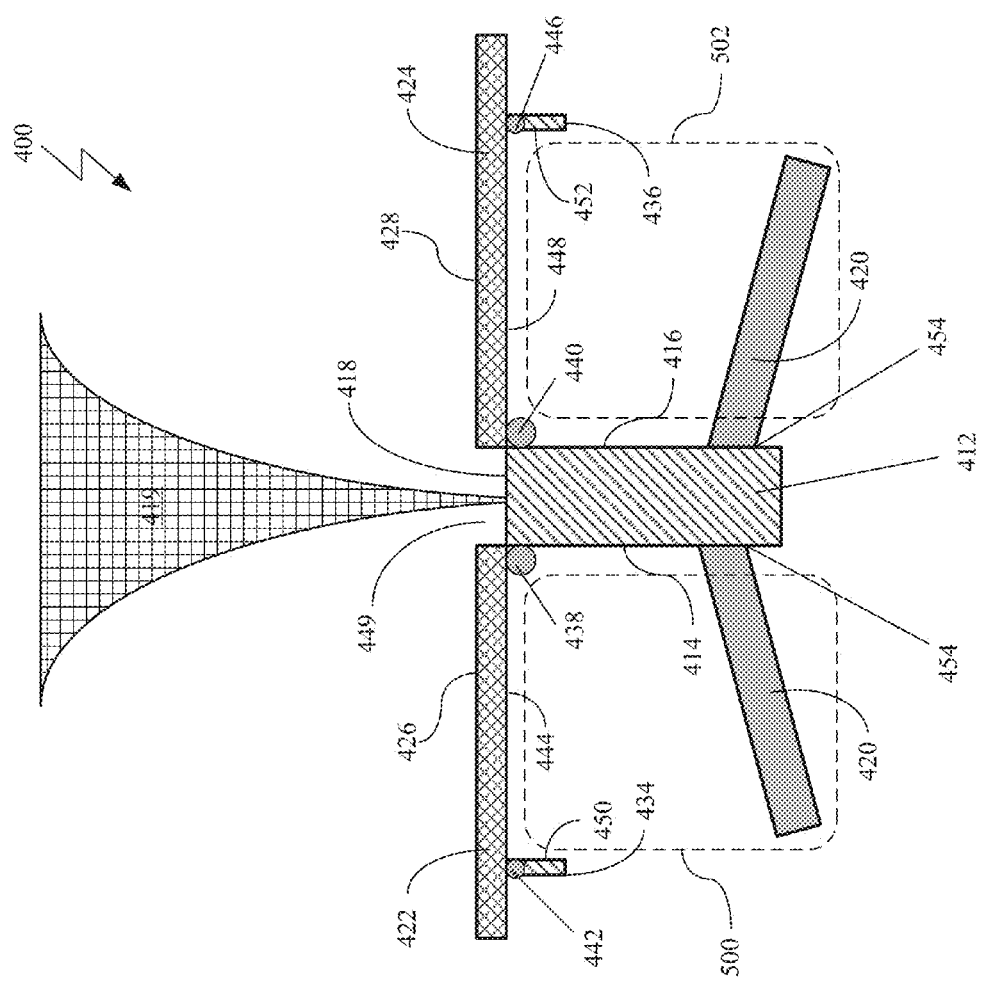
FIG. 5D is a front-view of an example of an implementation of the removable seat divider shown in FIGS. 4, 5A, 5B, and 5C in an extended state including a privacy block member in accordance with the present invention.

In FIG. 5C, a front zoomed-in-view of the example of the implementation of the removable seat divider 400 (shown in FIGS. 4, 5A, and 5B) is shown in an extended state in accordance with the present invention. In this view, the seat belt 420 is shown passing through the cavity 454. When the removable seat divider 400 is in the collapsed position (as shown in FIGS. 5A and 5B), it may be stowed efficiently under the seat or in an overhead storage bin. FIG. 5D is a front-view of the removable seat divider 400 (shown in FIGS. 4, 5A, 5B, and 5C) in an extended state including the privacy block member 419 in accordance with the present invention. In this example, two semi-private storage areas 500 and 502 are shown under the first and second planar members 422 and 424, respectively, for storing personal item on the seat out of sight from the adjacent passenger. It is appreciated by those of ordinary skill in the art that the privacy block member 419 may be either a flexible privacy block, solid divider, or a combination of both.

Figure 6:
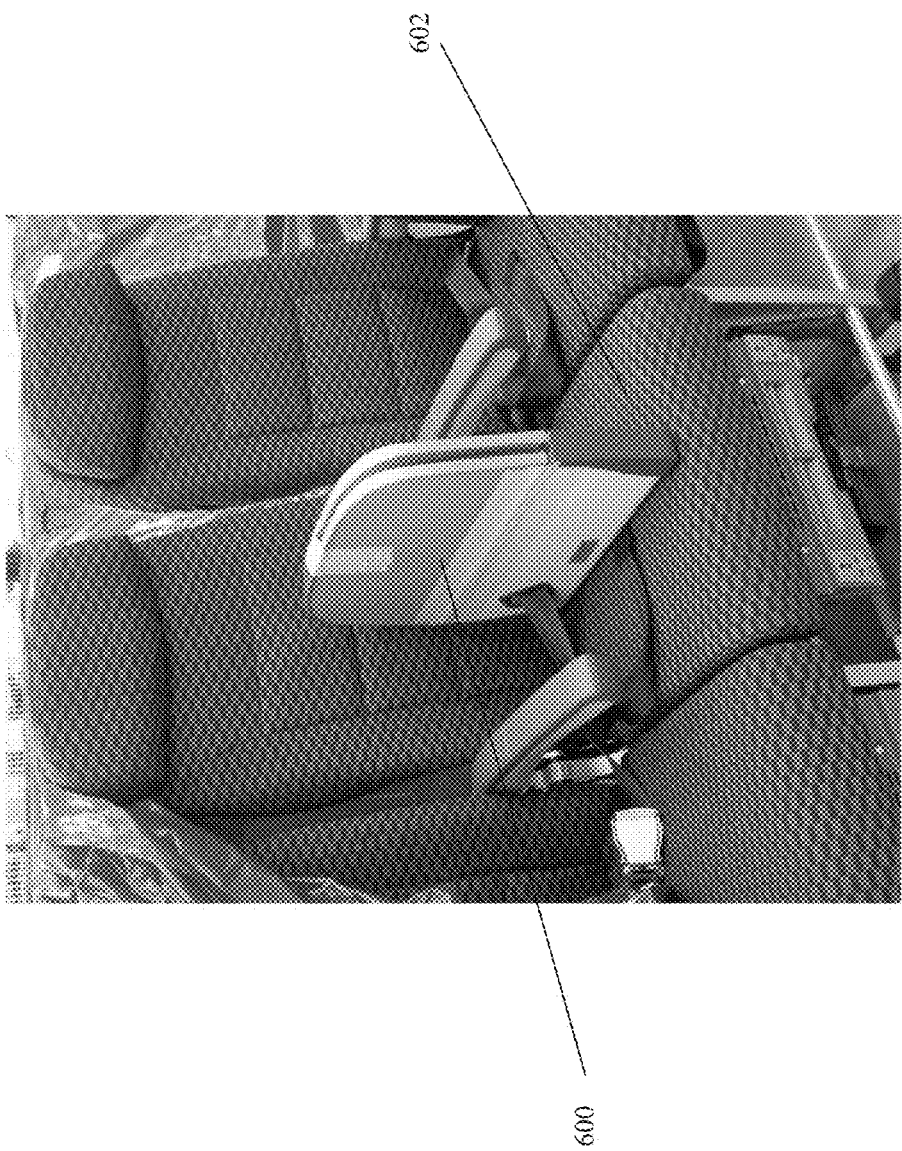
FIG. 6 is a front-perspective-view an example of an implementation of the removable seat divider, shown in FIGS. 4 through 5C, in a collapsed state in a seat in accordance with the present invention.
Figure 7:
FIG. 7 is a front-perspective-view an example of an implementation of the removable seat divider, shown in FIGS. 4 through 6, in an expanded state in the seat in accordance with the present invention.

In FIG. 6, a front-perspective-view an example of an implementation of the removable seat divider 600 (shown in FIGS. 4 through 5C) is shown in a collapsed state in a seat 602 in accordance with the present invention. FIG. 7 is a front-perspective-view an example of an implementation of the removable seat divider 700 (shown in FIGS. 4 through 6) in an expanded state in the seat 702 with the privacy block member 704 deployed in accordance with the present invention.

Figure 8:
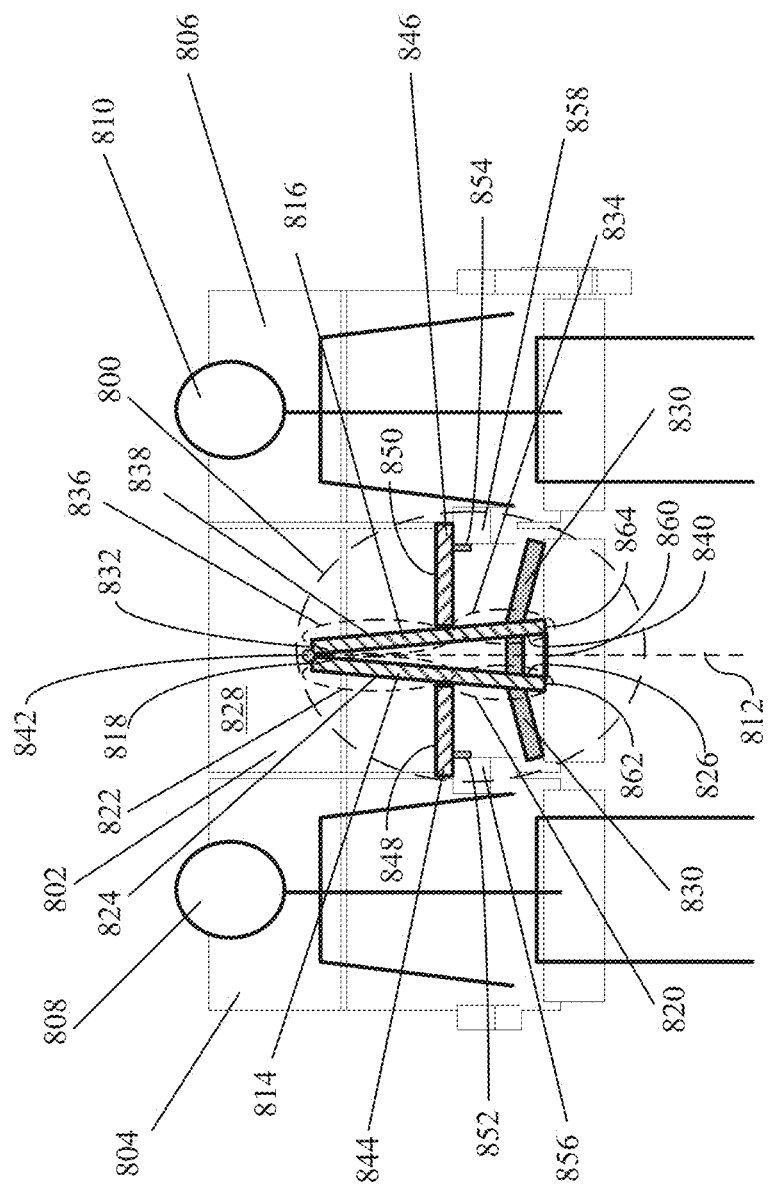
FIG. 8 is a front-view of an example of yet another implementation of a removable seat divider in a seat in accordance with the present invention.

Turning to FIG. 8, a front-view of an example of yet another implementation of a removable seat divider 800 is shown in a seat 802 in accordance with the present invention. As described earlier, the seat 802 may be a center seat that is located between two adjacent other seats 804 and 806, which may be either an aisle or window seats. In this example, the center seat 802 and two adjacent seats 804 and 806 may be seats in a commercial aircraft or other passenger vehicle such as, for example, a train, bus, or ship. The removable seat divider 800 may be utilized by two persons 808 and 810 seated in the adjacent seats 804 and 806, respectively. In general, the removable seat divider 800 may be placed along an approximate center line 812 of the seat 802.

The removable seat divider 800 may include a first vertical member 814, second vertical member 816. The first vertical member 814 has a first vertical member top 818, first vertical member back portion (not shown), first vertical member bottom portion 820, first vertical member upper portion 822, first outer surface 824, first inner surface 826, and first cavity (not shown) located within the first vertical member 814 bottom portion 820 and adjacent to the first vertical member back portion. The first vertical member 814 back portion is configured to be placed adjacent to a back portion 828 of the seat. Additionally, the first cavity connects the first outer surface 824 to the first inner surface 826 and is configured to pass a seat belt 830 through the first cavity.

Similarly, the vertical member 816 has a second vertical member top 832, second vertical member back portion (not shown), second vertical member bottom portion 834, second vertical member upper portion 836, second outer surface 838, second inner surface 840, and second cavity (not shown) located within the second vertical member 816 bottom portion 834 and adjacent to the second vertical member back portion. The second vertical member 816 back portion is also configured to be placed adjacent to the back portion 828 of the seat. Additionally, the second cavity connects the second outer surface 838 to the second inner surface 840 and is configured to pass the seat belt 830 through the second cavity.

The removable seat divider 800 may also include a top hinge 842 rotationally coupling the first vertical member 814 top 818 to the second vertical member 816 top 832 such that the first inner surface 826 is adjacent to the second inner surface 840. Furthermore, the removable seat divider 800 may also include a first planar member 844 and a second planar member 846 that fold outward from the first outer surface 824 and second outer surface 838 to form a first work surface 848 and second work surface 850, respectively.

In this example, the first vertical member back portion and the second vertical member back portion are configured to produce a restraining force against the seat 802 that is proportional to a tension on the seat belt 830 that passes through the first and second cavities. Additionally, the first planar member 844 may include a first armrest support flap 852 and the second planar member 846 may include a second armrest support flap 854, where the first armrest support flap 852 is configured to engage the first armrest 856 of the seat and the second armrest support flap 854 is configured to engage the second armrest 858.

The removable seat divider 800 may also include a bottom horizontal member 860 that is configured to attach a bottom 862 of the first vertical member 814 to a bottom 864 of the second vertical member 816 and a folding rigid member (not shown) that connects the first inner surface 826 to the second inner surface 840 and extends between the first cavity and the second cavity. In this example, the bottom horizontal member 860 may be flexible strap. Additionally, in this example, the folding rigid member, in combination with the first cavity and second cavity, is configured to produce a restraining force against the seat 802 that is proportional to a tension on the seat belt 830 that passes through the combination of the first and second cavities and rests along a surface of the folding rigid member. Additionally, this configuration allows the seat beat to provide a force that tends to prevent the first and second vertical members 814 and 816 from rotating back to the collapsed position. In general, the combination of the top hinge 842 and the first and second vertical members 814 and 816 form an A-frame type of structure when expanded.

Figures 9A, 9B:
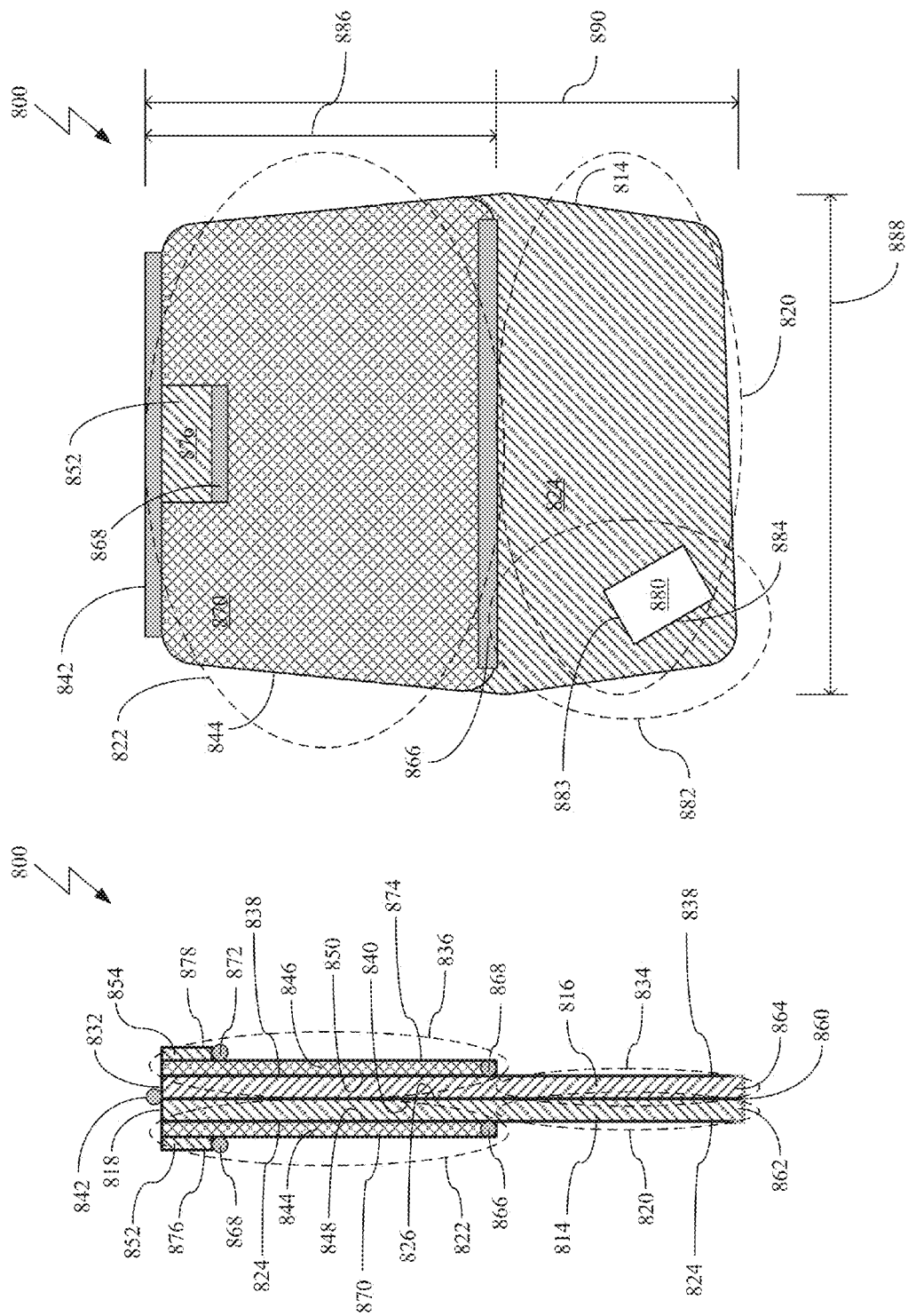
FIG. 9A is a front-view of an example of an implementation of the removable seat divider shown in FIG. 8 in a collapsed state in accordance with the present invention.
FIG. 9B is a side-view of an example of an implementation of the removable seat divider shown in FIGS. 8 and 9A in a collapsed state in accordance with the present invention.

In FIG. 9A, a front-view of an example of an implementation of the removable seat divider 800 (shown in FIG. 8) is shown in a collapsed state in accordance with the present invention. In this example, the removable seat divider 800 may include a second hinge 866 rotationally coupling the first planar member 844 to the first outer surface 824 of the first vertical structure 814. Similarly, the removable seat divider 800 may also include a third hinge 868 rotationally coupling the second planar member 846 to the second outer surface 838 of the second vertical structure 816. Furthermore, the removable seat divider 800 may include a fourth hinge 868 rotationally coupling the first armrest support flap 852 to the bottom 870 of the first planar member 814. Similarly, the removable seat divider 800 may also include a fifth hinge 872 rotationally coupling the second armrest support flap 854 to the bottom 874 of the second planar member 846.

It is appreciated by those of ordinary skill in the art that while the first and second planar members 844 and 846 are shown in FIG. 9A as resting adjacent to the first and second outer surfaces 824 and 838 of the first vertical structure 814 and second vertical structure 816, this is for simplicity and does not limit other possible arrangements. As an example, the first and second planar members 844 and 846 may rest within pocket cavities (not shown) along the first and second outer surfaces 824 and 838 that allow the bottom 870 and 874 of the first and second planar members 844 and 846 to be flush with the first and second outer surfaces 824 and 838, respectively. Furthermore, in this example, the second and third hinges 866 and 868 may also rest within pocket cavities. Moreover, the second and third hinges 866 and 868 may be integrated within the first and second planar members 844 and 846.

It is also appreciated that the first and second armrest support flaps 852 and 854 may also rest within pocket cavities (not shown) along the bottom 870 and 874 of the first and second planar members 844 and 846, respectively, that allow the bottom 876 and 878 of the armrest support flaps 852 and 854 to be flush with the bottom 870 and 874 of the first and second planar members 814 and 816, respectively. Similarly, in this example, the fourth and fifth hinges 868 and 872 may also rest within pocket cavities of the first and second planar members 844 and 846. Additionally, the fourth and fifth hinges 868 and 872 may be integrated within the first and second planar members 844 and 846.

In FIG. 9B, a side-view of an example of the implementation of the removable seat divider 800 (shown in FIGS. 8 and 9A) is shown in a collapsed state in accordance with the present invention. In this view, the removable seat divider 800 is shown having the first planar member 844, first hinge 842, second hinge 866, first armrest support flap 852, and fourth hinge 868. Additionally, in this example, the first vertical structure 814 is shown having a pass through cavity 880 (i.e., a hole) in the back portion 882 of the first vertical structure 814. The cavity 880 passes through the back portion 882 of the first vertical structure 814 connecting the first inner and outer surfaces 826 and 824. The size, shape, and thickness of the cavity 880 is configured to pass a seat belt 830 (shown in FIG. 8) through the cavity 880 and in combination with the configuration (i.e., the size, shape, and thickness) of the back portion 882 of the first vertical structure 814 to produce a restraining force against the back 828 of a seat 802 that is proportional to a tension placed on a seat belt 830 that passes through the cavity 880. As an example, the cavity 880 may have dimensions of approximately 2.0 inches by 2.5 inches along the cavity edges 883 and 884, respectively, with a depth of approximately one inch. Additionally, the two planar members 844 and 846 may have an approximate equal length 886 of about 8.5 inches with a width 888 of approximately 16 inches and the first and second vertical structures 814 and 816 may be approximately 16 inches in length 890 and width 888.

Figure 9C:
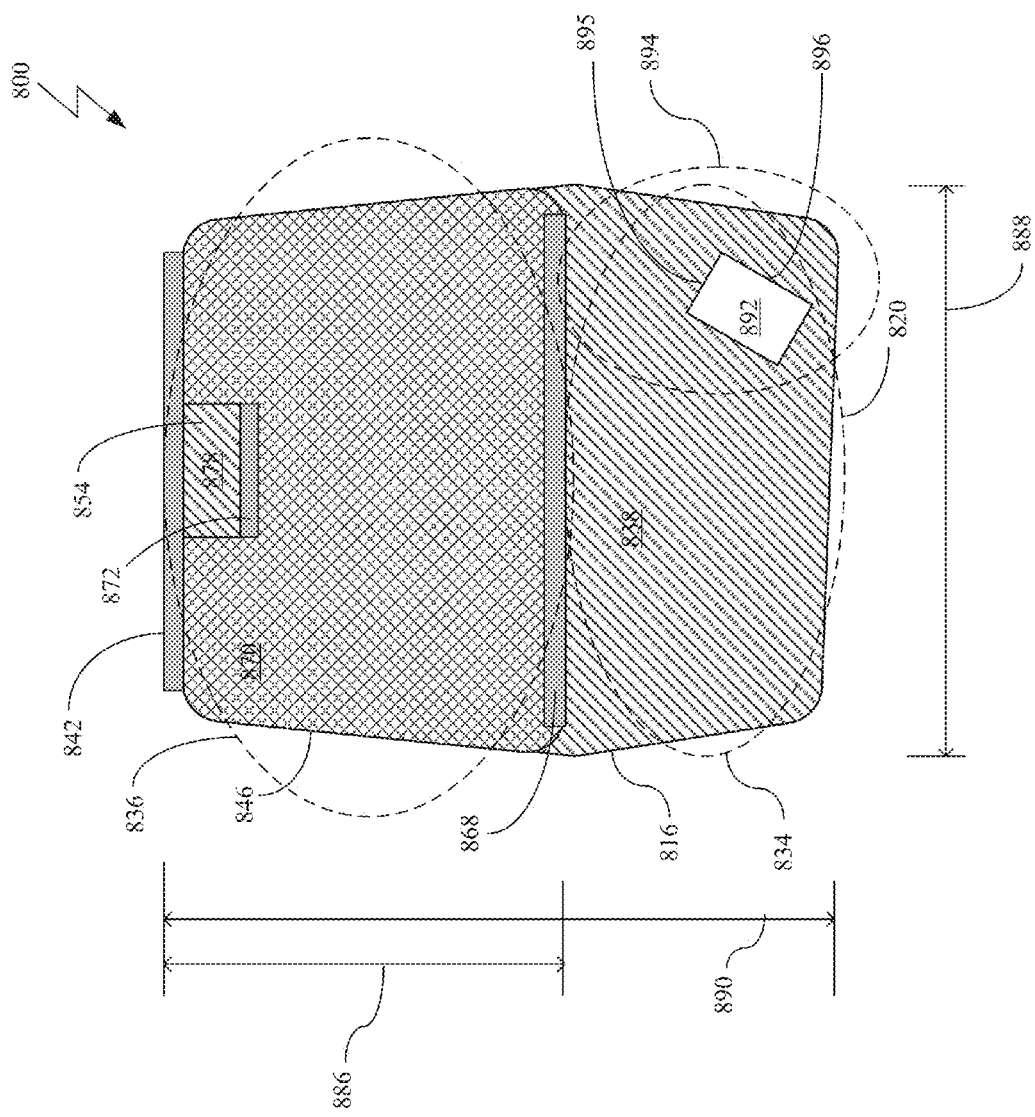
FIG. 9C is another side-view of an example of an implementation of the removable seat divider shown in FIGS. 8 and 9A in a collapsed state in accordance with the present invention.

In FIG. 9C, an opposite side-view of an example of the implementation of the removable seat divider 800 (shown in FIGS. 8 and 9A) is shown in a collapsed state in accordance with the present invention. In this example, the side-view is of the second vertical structure 816. In this view, the removable seat divider 800 is shown having the second planar member 846, first hinge 842, third hinge 868, second armrest support flap 854, and fifth hinge 872. Additionally, in this example, the second vertical structure 816 is shown having a pass through cavity 892 in the back portion 894 of the second vertical structure 816. The cavity 892 passes through the back portion 894 of the second vertical structure 816 connecting the second inner and outer surfaces 840 and 838. Again, the size, shape, and thickness of the cavity 892 is configured to pass a seat belt 830 through the cavity 880 and in combination with the configuration (i.e., the size, shape, and thickness) of the back portion 882 of the first vertical structure 814 to produce a restraining force against the back 828 of a seat 802 that is proportional to a tension placed on a seat belt 830 (shown in FIG. 8) that passes through the cavity 892. As an example, the cavity 892 may have dimensions of approximately 2.0 inches by 2.5 inches along the cavity edges 895 and 896, respectively, with a depth of approximately one inch.

Figure 9D:
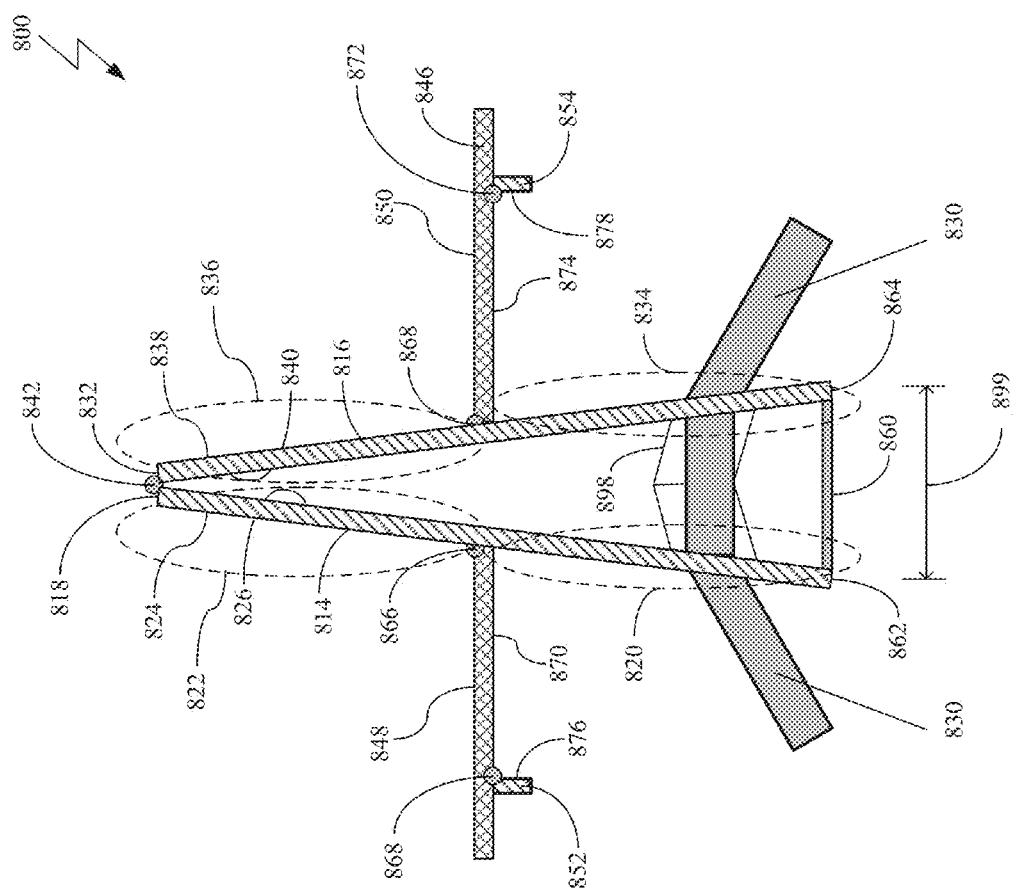
FIG. 9D is a front-view of an example of an implementation of the removable seat divider shown in FIGS. 8 through 9C in an extended state in accordance with the present invention.

In FIG. 9D, a front zoomed-in-view of the example of the implementation of the removable seat divider 800 (shown in FIGS. 8 through 9C) is shown in an extended state in accordance with the present invention. In this view, the seat belt 830 is shown passing through the first and second cavities 880 and 892 and sliding adjacent to the folding rigid member 898 that is connected between the first and second inner surfaces 826 and 840 and is configured to connect the first and second cavities 880 and 892. In general, the seat belt 830 tension on the folding rigid member 898 keeps the A-frame of the first and vertical structure 814 and 816 in an open position. In this example, the bottom 862 and 864 of the first and second vertical structures 814 and 816, respectively, are shown to be spaced 899 about 3.5 inches apart. When the removable seat divider 800 is in the collapsed position (as shown in FIGS. 9A, 9B, and 9C), it may be stowed efficiently under the seat or in an overhead storage bin.

Figure 10:
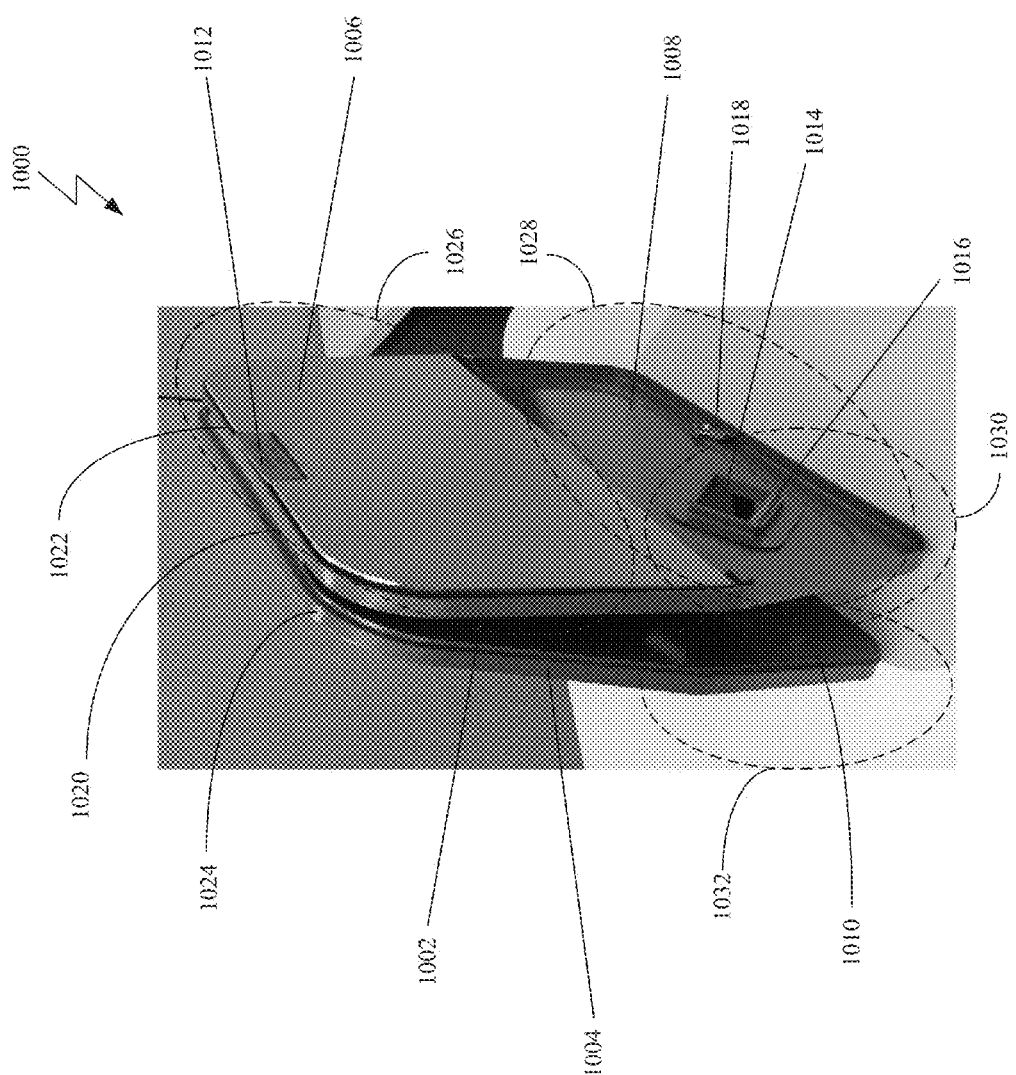
FIG. 10 is a back-perspective-view an example of an implementation of the removable seat divider, shown in FIGS. 8 through 9D, in a partially expanded state in accordance with the present invention.

Turning to FIG. 10, a back-perspective-view an example of an implementation of the removable seat divider 1000 (shown in FIGS. 8 through 9C) is shown in a partially expanded state in accordance with the present invention. In this example, the first and second vertical structures 1002 and 1004, first planar member 1006, first outer surface 1008, second inner surface 1010, first armrest support flap 1012, first cavity 1014, folding rigid member 1016, and bottom horizontal member 1018 (shown as a strap), first hinge 1020, top 1022 and 1024 of the first and second vertical structures 814 and 816, top and bottom portions 1026 and 1028 of the first and second vertical structures 1002 and 1004, and back portions 1030 and 1032 of the first and second vertical structures 1002 and 1004 are shown.

Figure 11:
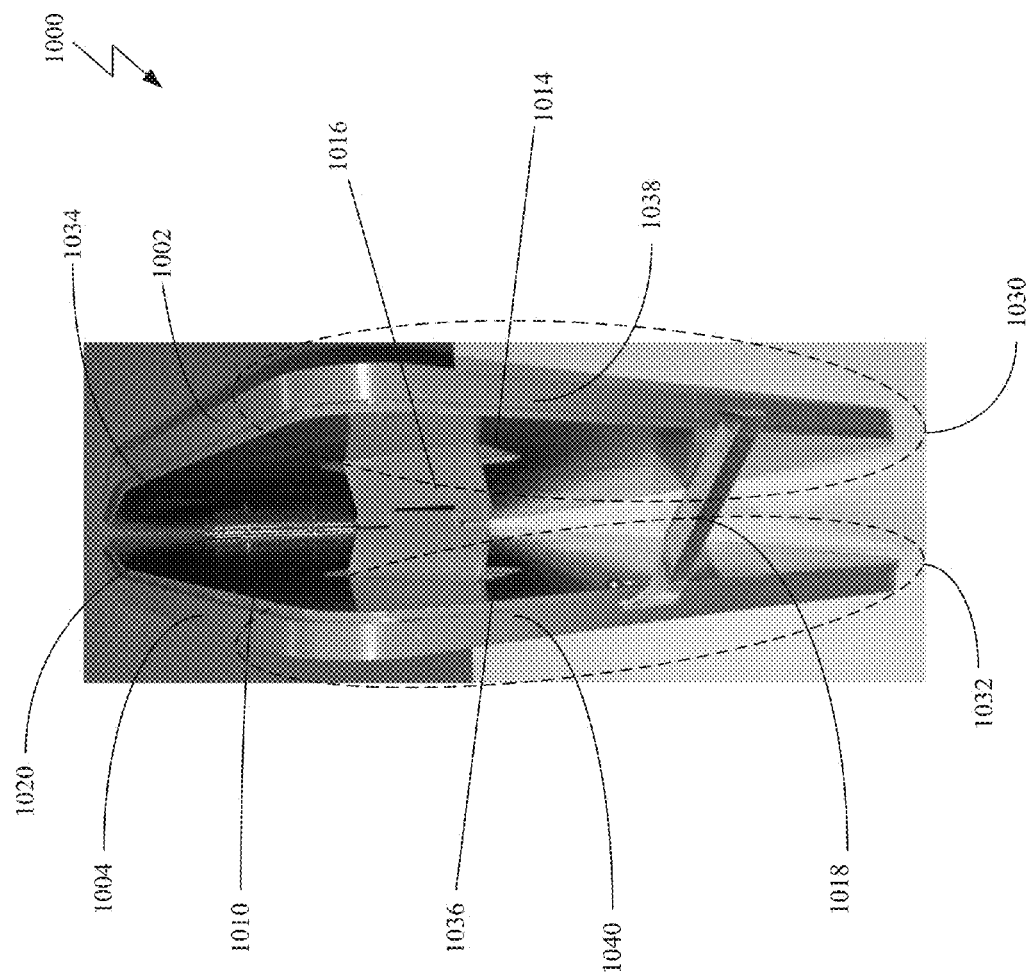
FIG. 11 is a bottom-perspective-view an example of an implementation of the removable seat divider, shown in FIGS. 8 through 10, in an expanded state in accordance with the present invention.

In FIG. 11, a bottom-perspective-view an example of an implementation of the removable seat divider 1000 (shown in FIG. 10) in an expanded state in accordance with the present invention. In this view, the first and second vertical structures 1002 and 1004, first inner surface 1034, second inner surface 1010, first and second cavities 1014 and 1036, folding rigid member 1016, and bottom horizontal member 1018, first hinge 1020, back portions 1030 and 1032 of the first and second vertical structures 1002 and 1004, and bottoms 1038 and 1040 of the first and second vertical structures 1002 and 1004 are shown. In this example, the bottom horizontal member 1018 is shown to be a taught strap.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A removable seat divider for placement in a seat, the removable seat divider comprising:
   a vertical structure configured to be placed on the seat along an approximate center of the seat, wherein the vertical structure includes a first outer surface, second outer surface, a top, and a back portion, and wherein the back portion of the vertical structure is configured to be placed adjacent to a back portion of the seat;
   a cavity located adjacent to the back portion, wherein the cavity connects the first outer surface to the second outer surface, and the cavity is configured to pass a seat belt through the cavity, and wherein the back portion is configured to produce a restraining force against the seat that is proportional to a tension on the seat belt that passes through the cavity; and
   two opposing planar members that are rotationally coupled to the top of the vertical structure, wherein the two opposing planar members are configured to fold outward from the vertical structure to form a T-type structure, when fully folded out, having two work surfaces.

2. The removable seat divider of claim 1,
   wherein a first planar member of the two opposing planar members has a first length that is approximately equal to a second length of a second planar member of the two opposing planar members,
   wherein the first length allows the first planar member to rest on a first armrest of the seat, and
   wherein the second length allows the second planar member to rest on a second armrest of the seat opposite the first armrest.

3. The removable seat divider of claim 2, further including a first armrest support flap on the first planar member configured to engage the first armrest of the seat, and a second armrest support flap on the first planar member configured to engage the second armrest of the seat.

4. The removable seat divider of claim 3, further including a privacy block member that is configured to extend vertically upward from a center of the vertical structure.

5. A removable seat divider for placement along an approximate center of a seat, the removable seat divider comprising:
   a first vertical member having a first vertical member top, a first vertical member back portion, wherein the first vertical member back portion is configured to be placed adjacent to a back portion of the seat, a first vertical member bottom portion, a first vertical member upper portion, a first outer surface, a first inner surface, and a first cavity located within the first vertical member bottom portion and adjacent to the first vertical member back portion, wherein the first cavity connects the first outer surface to the first inner surface and is configured to pass a seat belt through the first cavity;
   a second vertical member having a second vertical member top, a second vertical member back portion, wherein the second vertical member back portion is configured to be placed adjacent to the back portion of the seat, a second vertical member bottom portion, a second vertical member upper portion, a second outer surface, a second inner surface, and a second cavity located within the second vertical member bottom portion and adjacent to the second vertical member back portion, wherein the second cavity connects the second outer surface to the second inner surface and is configured to pass the seat belt through the second cavity;
   a top hinge rotationally coupling the first vertical member top to the second vertical member top such that the first inner surface is adjacent to the second inner surface;
   a first planar member that folds outward from the first outer surface to form a first work surface; and
   a second planar member that folds outward from the second outer surface to form a second work surface, wherein the first vertical member back portion and the second vertical member back portion are configured to produce a restraining force against the seat that is proportional to a tension on the seat belt that passes through the first and second cavities.

6. The removable seat divider of claim 5, wherein the first planar member has a first length that is approximately equal to a second length of the second planar member, wherein the first length is approximately equal to a length of the first vertical member upper portion, wherein the second length is approximately equal to a length of the second vertical member upper portion, wherein the first length allows the first planar member to rest on a first armrest of the seat, and wherein the second length allows the second planar member to rest on a second armrest of the seat opposite the first armrest.

7. The removable seat divider of claim 6, further including a first armrest support flap on the first planar member configured to engage the first armrest of the seat,
   a second armrest support flap on the first planar member configured to engage the second armrest of the seat,
   a bottom horizontal member attaching a bottom of the first vertical member to a bottom of the second vertical member, a folding rigid member that connects the first inner surface to the second inner surface and extends between the first cavity and the second cavity,
   wherein the folding rigid member, in combination with the first cavity and the second cavity, is configured to produce a restraining force against the seat that is proportional to a tension on the seat belt that passes through the combination of the first and second cavities and rests along a surface of the folding rigid member.

8. The removable seat divider of claim 7, wherein the bottom horizontal member is a flexible strap.

9. A removable seat divider for placement in a seat, the removable seat divider comprising:
   a vertical structure configured to be placed on the seat along an approximate center of the seat, wherein the vertical structure includes a first outer surface, a second outer surface, and a base, wherein the base includes a first outer surface lower portion of the first outer surface, a second outer surface lower portion of the second outer surface, and a base back portion that is configured to be placed adjacent to a back portion of the seat;

a base cavity located in the base and adjacent to the base back portion, wherein the base cavity connects the first outer surface lower portion to the second outer surface lower portion, wherein the base cavity is configured to pass a seat belt through the base cavity, and wherein the base back portion is configured to produce a restraining force against the seat that is proportional to a tension on the seat belt that passes through the base cavity; and two opposing planar members that fold outward from the vertical structure to form two work surfaces.

10. The removable seat divider of claim 9, wherein a first opposing planar member of the two opposing planar members folds outward from the first outer surface and a second opposing planar member of the two opposing planar members folds outward from the second outer surface.

11. The removable seat divider of claim 10, further including a first hinge between the first opposing planar member and the first outer surface and a second hinge between the second opposing planar member and the second outer surface.

12. The removable seat divider of claim 11, wherein the first opposing planar member has a first length and the second opposing planar member has a second length and wherein the first length and the second length of the first and the second opposing planar members, respectively, are approximately equal to a length of an outer surface upper portion.

13. The removable seat divider of claim 12, wherein the first length allows the first opposing planar member to rest on a first armrest of the seat and the second length allows the second opposing planar member to rest on a second armrest of the seat rest opposite the first armrest.

14. The removable seat divider of claim 13, further including a first armrest support flap on the first opposing planar member configured to engage the first armrest of the seat and a second armrest support flap on the first opposing planar member configured to engage the second armrest of the seat.

15. The removable seat divider of claim 13, further including a privacy block member that is configured to extend vertically upward from a center of the base.

16. The removable seat divider of claim 12, wherein the vertical structure includes
a top portion of the vertical structure,
a first semi-vertical member,
a second semi-vertical member, and
a third hinge at the top portion of the vertical structure that rotationally couples the first semi-vertical member to the second semi-vertical member,
wherein the first semi-vertical member includes
the first outer surface,
a first inner surface, and
a first cavity located adjacent to the base back portion of the vertical structure,
wherein the first cavity connects the first outer surface lower portion to the first inner surface and the first cavity is configured to pass the seat belt through the first cavity,
wherein the second semi-vertical member includes
the second outer surface,
a second inner surface, and
a second cavity located adjacent to the base back portion of the vertical structure,
wherein the second cavity connects the second outer surface lower portion to the second inner surface and the second cavity is configured to pass the seat belt through the second cavity,
wherein the base includes a lower portion of the first semi-vertical member and a lower portion of the second semi-vertical member,
wherein the base cavity includes the first cavity and the second cavity,
wherein the base cavity connects the first outer surface lower portion to the second outer surface lower portion, and
wherein the base cavity is configured to pass a seat belt through the base cavity.

17. The removable seat divider of claim 16, wherein the first length allows the first opposing planar member to rest on a first armrest of the seat and
the second length allows the second opposing planar member to rest on a second armrest of the seat rest opposite the first armrest.

18. The removable seat divider of claim 17, further including a first armrest support flap on the first opposing planar member configured to engage the first armrest of the seat and a second armrest support flap on the first opposing planar member configured to engage the second armrest of the seat.

19. The removable seat divider of claim 18, further including a bottom horizontal member attaching a bottom of the first semi-vertical member to a bottom of the second semi-vertical member.

20. The removable seat divider of claim 19, further including a base cavity connecting member that connects the first inner surface to the second inner surface and extends between the first cavity and the second cavity, wherein the base cavity connecting member is a folding rigid member that, in combination with the first cavity and second cavity, is configured to produce a restraining force against the seat that is proportional to a tension on the seat belt that passes through the combination of the first and the second cavities and rests along a surface of the base cavity connecting member, and
wherein the bottom horizontal member is a flexible strap.

* * * * *